Jan. 2, 1934. C. M. FOUST 1,942,384
METHOD OF AND INSTRUMENT FOR MEASURING SURGE CURRENTS
Filed April 1, 1933
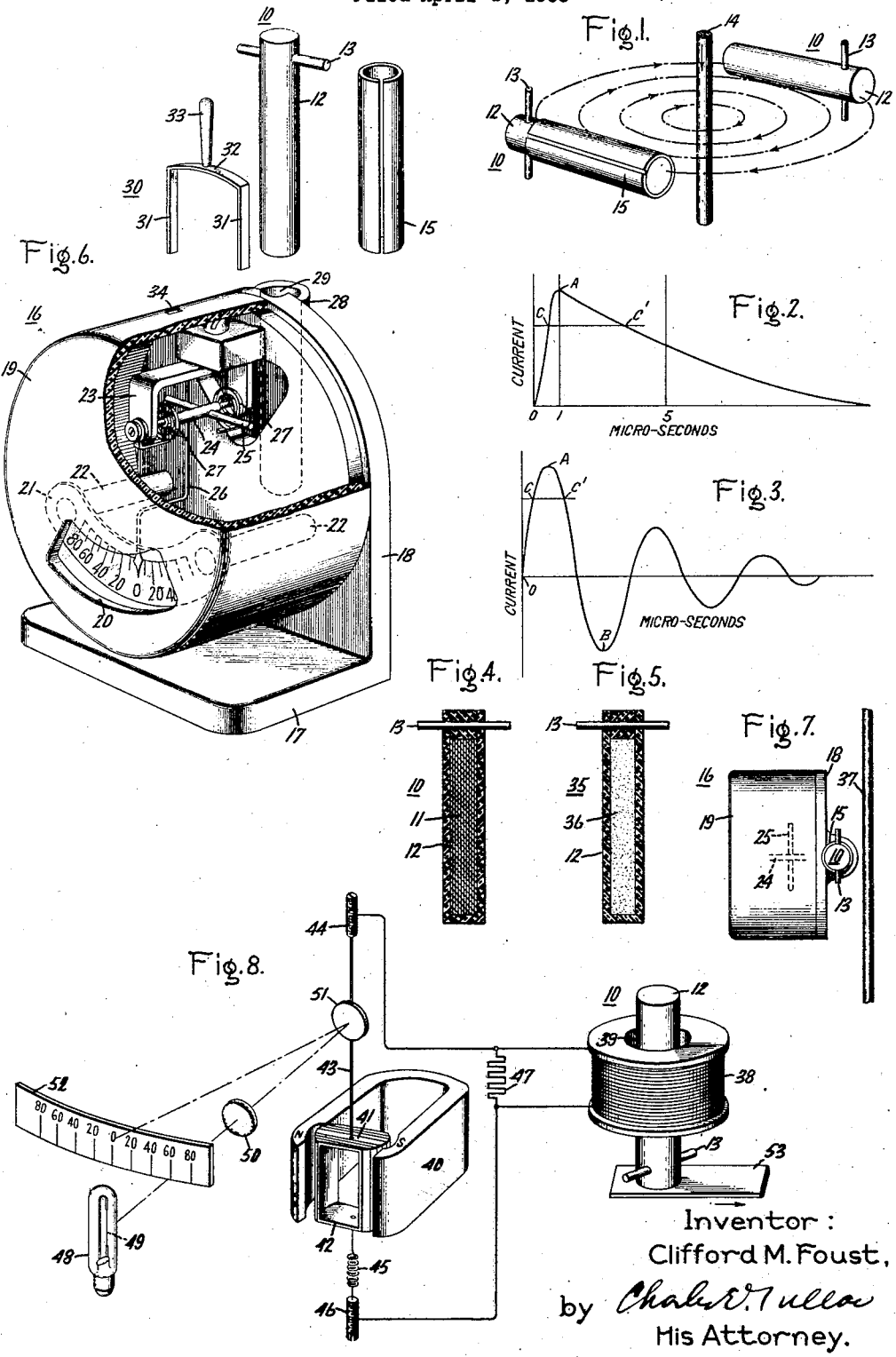
Inventor:
Clifford M. Foust,
by Charles E. Tullar
His Attorney.

Patented Jan. 2, 1934

1,942,384

UNITED STATES PATENT OFFICE 1,942,384

METHOD OF AND INSTRUMENT FOR MEASURING SURGE CURRENTS

Clifford M. Foust, Schenectady, N. Y., assignor to General Electric Company, a corporation of New York Application April 1, 1933. Serial No. 663,978

17 Claims. (Cl. 175—183)

My invention relates to surge current measurements. The principal object of my invention is to provide a method of and an instrument for measuring the maximum value of an electric current surge that flowed through a conducting body, irrespective of the nature and duration of the surge, the indication to remain visible after the surge is over. An additional object of my invention is to provide a method of and an instrument for determining whether an oscillatory or a unidirectional surge current flowed through a conducting body.

In a copending United States patent application, Serial No. 644,504, filed jointly by me and H. P. Kuehni, on November 26, 1932, and assigned to the assignee of this application, there is illustrated and described a method of and several embodiments of an instrument for measuring the maximum value of an electric current surge that flowed through a conducting body. A brief description of the principle underlying the invention disclosed in the above referred to copending patent application will be helpful in understanding the necessities for and advantages of the invention forming the subject matter of this patent application. This underlying principle consists of so placing a magnetic body possessing a high degree of magnetic retentivity adjacent the conducting body through which the current surge flows that the magnetic flux surrounding the latter during the surge magnetizes this magnetic body. The magnitude of the magnetic flux retained by this magnetic body after the current surge is over is a function of the maximum value of the surge current, and this flux magnitude is then measured either by a ballistic galvanometer or by an indicating instrument which is suitably calibrated with this magnetic body, thus obtaining an indication of the maximum value of the surge current. Accurate measurements can be obtained in this manner of the maximum value of a unidirectional current surge, but not of an oscillatory current surge unless the last alternation thereof has the maximum amplitude, this, however, being a rare case. When successive alternations of an oscillatory surge have different maximum values, the magnetic flux retained by the magnetic body at the end of one alternation is either increased or decreased during the next alternation, and at the end of the surge this magnitude of the magnetic flux retained by the magnetic body is a function of the maximum value of the surge current during the last alternation. In practically all oscillatory surges the maximum surge current does not occur during the last alternation of the surge, hence the apparatus described in the aforesaid copending patent application is unable accurately to measure the maximum value of practically all oscillatory surge currents.

Oscillatory current surges whose succeeding alternations have decreasing maximum values until the steady state operating condition is reached are a common occurrence in the electrical art. A well known example is the inrush current to alternating current apparatus such as transformers and motors when they are first connected to their source of current. On the other hand, there are cases where a current surge may be unidirectional or oscillatory. For example, a flashover of the transmission line insulators supported by a transmission tower arm due to a lightning discharge or a switching operation may cause a unidirectional or an oscillatory current surge through the tower arm. Also a lightning stroke discharging through a transmission tower or a lightning arrester may cause a unidirectional or an oscillatory current surge through the tower or lightning arrester. It is frequently desirable to measure the maximum value of the surge current through the tower, tower arm, or lightning arrester, as the case may be, irrespective of whether the surge is unidirectional or oscillatory. It is also frequently desirable to measure the maximum value of the inrush oscillatory current surge to alternating current apparatus when they are first connected to their source. It therefore became desirable to provide a method of or an instrument for measuring the maximum value of a current surge irrespective of whether it is unidirectional or oscillatory.

My invention provides both the method and the instrument. Briefly described, my method consists of screening the magnetic body possessing the high degree of magnetic retentivity from the magnetic flux surrounding the conducting body during such a portion or portions of the current surge period that the magnetic flux retained by the magnetic body at the end of the surge will be a function of the maximum value of the surge current irrespective of whether the surge was unidirectional or oscillatory. Any suitable means may be employed for carrying this method into effect. I prefer to do this by associating with the magnetic body a suitably proportioned shield of magnetic material. After the surge is over, the magnitude of the magnetic flux retained by the magnetic body possessing the high degree of magnetic retentivity is measured by suitable means and the result interpreted in terms of maximum value of the surge current.

My invention will, however, be best understood from the following description when considered in connection with the accompanying drawing, while those features of my invention which are believed to be novel and patentable are pointed out in the appended claims.

Fig. 1 of the drawing shows a perspective view of a magnetically screened magnetic pick-up element adjacent a conductor through which a unidirectional or oscillatory surge current may flow, this figure being useful in explaining the underlying principle of my invention. The curves shown in Figs. 2 and 3 graphically represent a unidirectional current surge and a portion of an oscillatory current surge, respectively, that may flow through the conductor shown in Fig. 1, these two curves also being helpful in obtaining an understanding of my invention. Figs. 4 and 5 represent two embodiments of magnetic pick-up elements that may be employed when they are magnetically screened, as shown for example in Fig. 1. Fig. 6 represents a perspective view of a preferred embodiment of a surge current ammeter with a magnetic pick-up element and its magnetic shield. Fig. 7 represents a top view of the ammeter shown in Fig. 3 assembled with its magnetically screened magnetic pick-up element adjacent a conductor for measuring the maximum value of a unidirectional or oscillatory current surge therethrough. Fig. 8 represents a perspective view of a ballistic galvanometer for measuring the magnitude of the magnetic flux retained by the pick-up element at the end of a current surge in terms of the maximum value of the surge current. Similar parts in the various figures are represented by the same reference characters.

I will first describe how to measure the maximum value of an oscillatory current surge when employing the magnetic pick-up element shown in Fig. 4, and the instrument shown in Fig. 6. The magnetic pick-up element shown in Fig. 4 is represented generally by 10 and consists of a plurality of strips 11 made of a magnetic material possessing a high degree of magnetic retentivity, these strips being preferably located inside of a hollow container of non-magnetic material represented by 12. This container is closed at one end and open at its opposite end for the insertion and withdrawal of the strips. A pin 13, preferably of non-magnetic material, passes through the container at its open end above the strips to prevent the latter from falling out, irrespective of the position of the container, and also to serve another useful purpose which will be described later. I prefer to make strips 11 out of cobalt steel, because this material possesses a high degree of magnetic retentivity; but it should be understood that my invention is not limited to this material, since any material possessing this quality may be employed.

In Fig. 1, let 14 represent any conductor through which the oscillatory surge current may flow. At a suitable distance from this conductor I place a pick-up element 10 in such a position that it will become magnetized by the magnetic flux surrounding the conductor during the current surge, the supporting means for the element not being shown, in order to make the view as clear as possible. This element 10 is surrounded by a magnetic shield 15, which is slotted and so formed that in its free state the internal diameter thereof is slightly smaller than the outside diameter of the element whereby it tightly grips the element. (See Fig. 6 for a clear view of the shield itself.) Shield 15 may be of any magnetic material, and preferably it should be of a material having a high permeability at low flux densities and a sharp knee near the saturation point on its magnetization curves, such a material, for example, being a nickel iron alloy, known as Permalloy, and which is described in United States Patent No. 1,586,883. Adjacent conductor 14 is another pick-up element 10 which has no shield 15, the purpose being to make it possible to determine whether an oscillatory or a unidirectional surge passed through the conductor, as will be fully described later.

Now, assume that an oscillatory current surge flows through conductor 14 in Fig. 1, that this surge is, for example, graphically represented in part by the curve shown in Fig. 3 and that it is desired to know the maximum value of this surge current. No current values are shown for this surge, since they are immaterial to this description. Furthermore, since conductor 14 may represent a transmission tower arm in which a surge current flows due to a lightning stroke, in which case the surge current curve shown in Fig. 3 will decrease to zero amplitude, and since 14 may represent one of the conductors which connects a transformer or alternating current motor to its alternating current source and in which flows the inrush current when the transformer or motor is first connected to the source, in which case the surge current curve shown in Fig. 3 will settle down to a steady state value, I have not shown how the oscillatory surge current curve in Fig. 3 ends, because all we are interested in is to determine the maximum value of the surge current, and this maximum value is represented by point A in the first alternation of the surge. Unless otherwise stated, all subsequent reference to an element 10 adjacent conductor 14 will be to the one which is surrounded by shield 15.

Shield 15 is so proportioned that it will become substantially magnetically saturated when the magnitude of the flux which surrounds conductor 14 is at least equal to, and preferably slightly higher than, the maximum value of the magnetic flux which surrounds conductor 14 during that alternation of the surge which has the second highest amplitude, but which is appreciably lower than the maximum value of the magnetic flux which surrounds conductor 14 during that alternation of the surge which has the maximum surge current, as represented by point A, the reason for this being that the two alternations may be in opposite directions. In the surge current curve shown in Fig. 3, the second alternation has the second highest amplitude, which is represented by point B. Since the flux magnitude at any instant is substantially directly proportional to the instantaneous value of the surge current, shield 15 is so proportioned that it will become substantially magnetically saturated when the magnitude of the flux which surrounds conductor 14 is slightly higher than that which surrounds the conductor when the surge current has the value B. This slightly greater current than that represented by B at which shield 15 becomes substantially saturated is represented by points C, C', on the first alternation of the surge. Strips 11 are preferably so proportioned that they do not become magnetically saturated at the maximum flux magnitude which surrounds conductor 14 during the surge. Shield 15 is preferably so proportioned that its magnetic reluctance is considerably lower than that of strips 11 at low flux densities, and although its reluctance increases more rapidly than that of the strips because it becomes saturated before the strips, yet its reluctance will remain lower than that of the strips until it is nearly saturated, because it has a sharp knee near the saturation point on its magnetization curve. Consequently, shield 15 surrounding strips 11 functions as a magnetic screen and prevents any substantial amount of flux from passing through the strips until it is nearly saturated.

From the above it will be clear that from the beginning of the surge until the current has increased to nearly the value represented by C, the shield 15 acts as a magnetic screen and very little flux passes through strips 11. When the surge current has reached the value C the shield 15 becomes substantially saturated and as the current increases from value C to its maximum value A and then decreases to value C' the resulting additional flux passes through strips 11 as freely as if the shield were not there. As the surge current decreases below value C', the shield 15 again begins to function as a magnetic screen and so functions during the remainder of the surge, because this current value is not exceeded during the remainder of the surge. The magnitude of the magnetic flux retained by strips 11 at the end of the first alternation is a function of the maximum value A of the surge current. This magnitude of the retained magnetic flux is not decreased during the second alternation of the surge when the magnetic flux passes around conductor 14 in a direction opposite to that in which it passed during the first surge, because shield 15 functions as a magnetic screen for strips 11 during the second alternation. For the same reason this magnitude of retained magnetic flux is not increased or decreased during the remaining alternations, hence the magnitude of the magnetic flux retained by strips 11 at the end of the current surge is a function of the maximum value of the surge current. From this description it will be clear that the same will be true when the maximum surge current occurs during any alternation of the surge.

I also wish to point out that the magnitude of the magnetic flux retained by strips 11 at the end of the surge is not only dependent on the maximum value of the surge current, but is also dependent on several other factors, e. g., the thickness of each strip, the number of strips, their distance from conductor 14, and the time it takes the surge to reach its maximum value from zero value. During that portion of the surge current period when shield 15 is saturated, the strips 11 are threaded by a magnetic flux of varying intensity, hence eddy currents are caused to flow in the strips which tend to oppose their magnetization by this flux. Therefore, all other factors being equal, the thinner the strips are the smaller will be the value of the eddy currents flowing therethrough, and the greater will be the magnitude of the magnetic flux retained by them at the end of the surge. By making strips 11 of thin material, as, for example, .005" thick, the strips will retain sufficient magnetic flux to give a satisfactory measuring operation even after a very fast surge, as for example, a 1-5 micro-second surge, i. e., a surge that reaches its maximum value from zero in 1 micro-second and decreases to half its maximum value in 4 more micro-seconds. Furthermore, the value of the magnetic flux retained by strips 11 at the end of the surge will then be substantially equal to that which the strips would retain if a steady direct current of the same magnitude as the maximum value of the oscillatory surge were passed through conductor 14. Since with a given maximum value of surge current the slower the surge the lower are the eddy currents that are caused to flow in strips 11, it follows that with slower surges than a 1-5 micro-second surge the magnetic flux retained by the strips will also be substantially equal to that which the strips would retain if a steady direct current of the same magnitude as the maximum value of the surge were passed through conductor 14. It follows that by suitably selecting the thickness of strips 11 it is possible to have the magnitude of the magnetic flux retained by them after a surge is over substantially directly proportional to the maximum value of the surge current, and substantially independent of the time it takes the surge to reach its maximum value from zero value. Obviously, in some cases it will be satisfactory to use thicker strips; in fact, with very slow waves it may be satisfactory to use one solid piece, whereas with the faster surges it may be necessary to use thinner strips, or even use a mass of very small magnetic particles, as shown, for example, in the pick-up element illustrated in Fig. 5, which will be described in detail later. It is obvious that by employing a suitable magnetic shield 15 and suitable magnetic material for pick-up element 10, the latter will retain at the end of any oscillatory surge an appreciable magnitude of magnetic flux which is a function of the maximum value of the surge current.

The magnetic flux retained by pick-up element 10 after the oscillatory surge is over may be measured in any suitable manner and the result interpreted in terms of maximum value of the surge current. I will first describe how this can be done by employing the instrument shown in Fig. 6. This instrument is represented generally by 16, and consists of a base 17 having integral therewith or secured thereto a vertical shelf 18, and a hollow cylindrically shaped cover 19 removably secured by any suitable means (not shown) to shelf 18, all being preferably made of non-magnetic material. Cover 19 has a window 20, behind which is a graduated scale 21 secured to posts 22 carried by shelf 18. Scale 21 is of the zero center type, i. e., it has its zero mark at approximately the center with similarly marked graduations on both sides of the zero mark. A portion of cover 19 is shown broken away in order to give a clear view of the internal parts of the instrument. Secured to the inside of shelf 18 is a C-shaped bracket 23 in which is rotatably or pivotally mounted a small shaft 24. A small bar 25 is secured to shaft 24 with its longitudinal axis at a right angle to the axis of rotation of shaft 24. Bar 25 is preferably a permanent magnet with poles of opposite polarities at its two ends, but I wish it understood that this is desirable but not essential, since instrument 16 will operate when the bar is not a magnet, providing, however, it is made of magnetic material. Secured to shaft 24 is an indicating pointer 26 adapted to sweep over scale 21 and be visible through window 20. Two oppositely wound spiral springs 27 are respectively secured to the opposite ends of shaft 24 and bracket 23 so that one spring resists movement of the shaft in one direction and the other spring resists movement of the shaft in the opposite direction. Springs 27 are so adjusted and the various moving parts are so arranged that bar 25 is horizontal when it is in its normally stationary position, and pointer 26 then registers with its zero mark on scale 21. On the back side of shelf 18 is a boss 28 having a hole 29 whose axis is substantially perpendicular to the axis of the bar 25 when the latter is in its normally stationary position. This hole is preferably so positioned with respect to shaft 24 that the axis of the shaft intersects the axis of the hole. The diameter and depth of hole 29 are preferably such that pick-up element 10 with shield 15 thereon can be readily inserted into the hole with the bottom of the element resting on the bottom of the hole and with the element extending approximately equal amounts above and below the axis of rotation of shaft 24. A stop-key, represented by 30, consists of two parallel legs 31 secured to or integral with a back leg 32, to which is secured a handle 33. Legs 31 are adapted to slide through two holes in the top of cover 19, one of these holes being represented by 34, and the other hole not being shown since it is in the broken away portion of the cover. The spacing between legs 31 and their lengths are such that when they are inserted in and lowered through holes 34 of cover 19, their ends will rest on bar 25 near its opposite ends, thereby preventing rotation of the bar in either direction. This locks the internal moving parts of the instrument so that the latter may be transported without injury even though it is subjected to appreciable vibration. Preferably, legs 31 and 32 are made of magnetic material so as to function as a magnetic keeper or armature for bar 25 if the latter is a permanent magnet, thus tending to prevent demagnetization of the magnet when the instrument is not being used.

After the oscillatory surge is over pick-up element 10 is removed from its position adjacent conductor 14 and is brought over to instrument 16. Shield 15 is preferably left on element 10 until the latter is near instrument 16 so as to shield the element from stray magnetic flux during transit, and when the element is near the instrument the shield is removed from the element and the latter is inserted into hole 29. Whether bar 25 is or is not a magnet, the magnetic flux retained by element 10 will cause the bar to move to one side or the other from its normally stationary position and come to rest in a new position. The extent of the movement of the bar from its normally stationary position will depend on the magnitude of the magnetic flux retained by element 10, and will, therefore, depend on the maximum value of the surge current which passed through conductor 14; hence, by suitably calibrating the scale of instrument 16 the latter will indicate the maximum value of the surge current. The proper method of calibrating instrument 16 will be described later.

Now assume that instead of an oscillatory surge a unidirectional surge had flowed through conductor 14 without that fact being known, and that it is desired to determine the maximum value of this surge current. This can be accomplished in the manner described with the oscillatory surge, namely, proportioning shield 15 so that it becomes substantially saturated at a value of surge current which is appreciably below the maximum surge current. However, since a unidirectional surge consists of a single alternation, it is not necessary that this saturating value of surge current be at least equal to the surge current flowing at some instant during the surge as described in connection with the oscillatory surge. Thus, assume that a unidirectional surge having the same maximum value as the oscillatory surge shown in Fig. 3 flowed through conductor 14. This unidirectional surge is shown in Fig. 2, and is, for example, represented as a 1-5 micro-second surge whose maximum value is represented by point A. No values of current are shown for this surge, as they are immaterial to the description of the invention. Element 10 with shield 15 thereon will be positioned adjacent conductor 14 as shown in Fig. 1. From the description given in connection with the measurement of the maximum value of the oscillatory surge current, it will be clear that from the beginning of the unidirectional surge current until the current has increased to nearly the value represented by C in Fig. 2 the shield 15 acts as a magnetic screen and very little flux passes through strips 11, since points C, C' have the same values in Figs. 2 and 3. When the surge current has reached the value C, the shield becomes substantially magnetically saturated and as the current increases from value C to its maximum value A and then decreases to value C' the resulting additional flux passes through strips 11 as freely as if the shield were not there. As the surge current decreases below value C', shield 15 again begins to function as a magnetic screen and so functions during the remainder of the surge, because this current value is not exceeded during the remainder of the surge. Consequently, the magnitude of the magnetic flux retained by strips 11 at the end of the unidirectional surge is a function of the maximum value A of the surge current.

After the unidirectional surge current is over, element 10 with shield 15 thereon is taken to instrument 16, the shield removed from the element, and the latter inserted into hole 29 of the instrument, whereupon pointer 26 moves from its zero-indicating position and comes to rest in a new position. The extent of the pointer movement depends on the magnitude of the magnetic flux retained by element 10 after the surge is over, and, therefore, depends on the maximum value of the surge current. By suitably calibrating the scale of instrument 16, as hereinafter explained, pointer 26 will indicate the maximum value of the surge current that flowed through conductor 14. Furthermore, if it were known that a unidirectional surge current flowed through conductor 14, then the direction in which it flowed through the conductor can also be determined. The reason for this is that the relative positions of the magnetic poles of element 10 after the surge is over will depend on the direction in which the surge passed through the conductor, and since the element can be inserted into hole 29 of instrument 16 in only one manner, namely, with its pin 13 at the top, because the length of the pin is greater than the diameter of the hole, pointer 26 will, assuming bar 25 to be a permanent magnet, move to one side or the other of its zero-indicating position when element 10 is inserted into hole 29, depending on the direction in which the surge flowed through conductor 14. Hence, by determining in advance to which side pointer 26 of the instrument moves from its zero indicating position for a unidirectional surge current flowing in one direction or the other through conductor 14, as hereinafter explained, it is possible to determine the direction in which a unidirectional surge flowed through conductor 14.

The calibration of the scale of instrument 16 may be carried out in the following manner. Pick-up element 10 with shield 15 thereon is placed adjacent conductor 14 as shown in Fig. 1. An oscillatory or unidirectional surge having a known maximum value slightly higher than that necessary to cause substantial saturation of shield 15 is sent through the conductor. The pick-up element without the shield is then inserted in hole 29 of the instrument, whereupon pointer 26 moves from its normally stationary position to a new position. Scale 21 is then suitably marked so that pointer 26 in its new position indicates this known maximum value of the surge current that was sent through conductor 14. Element 10 is then removed from hole 29, demagnetized in any suitable manner known to those skilled in the art, and again placed with shield 15 thereon adjacent conductor 14 as shown in Fig. 1. Another surge current is then sent through conductor 14, having a higher maximum value than that of the previous surge. The pick-up element without the shield is then again inserted into hole 29 of the instrument and scale 21 suitably marked so that pointer 26 in its new position indicates the known maximum value of the second surge sent through the conductor. The process described is then repeated until the marking of scale 21 is completed. The previous determination as to which side pointer 26 moves from its zero-indicating position for a unidirectional surge current passing in one direction or the other through conductor 14 in Fig. 1 may be carried out in the following manner: Pick-up element 10 with shield 15 thereon is placed adjacent conductor 14 and a unidirectional surge current is sent through the conductor in a known direction, as, for example, in the direction shown by the arrow on the conductor. The pick-up element without the shield is then inserted in hole 29 of the instrument and it is noted to which side of its zero-indicating position pointer 26 moves. It is then known that all unidirectional surges through conductor 14 in the direction shown by the arrow thereon will produce indications of pointer 26 to this side of its zero-indicating position, whereas unidirectional surges through conductor in the opposite direction will produce indications of pointer 26 to the other side of its zero-indicating position. It should now be clear that instrument 16 will indicate the maximum value of an oscillatory or unidirectional surge that passed through conductor 14, and if it is known that this was a unidirectional surge the instrument will also indicate the direction in which the surge passed through the conductor. From the above description it will be obvious that it is also possible to determine the direction in which the current flowed through conductor 14 during that alternation of an oscillatory surge which had the maximum surge current.

I preferred to illustrate shield 15 as surrounding pick-up element 10 in order to function as a magnetic screen therefor. However, the shield and element may be arranged in any other manner than that shown, providing the shield acts as a magnetic screen for the element in the manner described. Thus, for example, 15 could represent a pick-up element consisting of a thin strip of cobalt steel, and 10 could represent a solid piece of high permeability magnetic material to act as a magnetic screen for 15.

The previously described measurements that can be obtained by employing element 10 can also be obtained by employing the pick-up element shown in Fig. 5. This pick-up element is represented generally by 35 and differs from element 10 by employing a mass of small particles of a magnetic material possessing a high degree of magnetic retentivity, instead of thin strips of such a material. This mass is represented by 36, and may, for example, consist of ground particles of hardened cobalt steel. Element 35 will have a higher magnetic reluctance and offer a higher resistance to the flow of eddy currents than element 10, because it consists of a mass of small oxidized particles insulated from each other by their oxidizing films, the oxidation occurring as the red hot particles come in contact with the air when they are ground from a solid piece. With some types of surge currents it will be preferable to employ element 35 instead of element 10.

In many cases it may be desirable to have an instrument permanently located adjacent a conductor through which a surge current may flow so as to indicate the maximum value of this current. This may be accomplished by placing instrument 16 adjacent the conductor through which the surge flows, as shown in Fig. 7, this conductor being represented by 37. Element 10 (or element 35) with shield 15 thereon is inserted in hole 29 of the instrument before the surge current passes through conductor 37. After the surge current is over, element 10 with the shield will be lifted out of hole 29, the shield removed from the element, and the latter reinserted in the hole, whereupon the pointer of the instrument will indicate the maximum value of the surge current that passed through conductor 37, and will also indicate the direction in which this surge current passed through the conductor, as described in connection with Fig. 6.

In Fig. 8, I illustrate another form of apparatus for carrying out that part of my method which relates to the measuring of the magnitude of the magnetic flux retained by a pick-up element. The apparatus illustrated in Fig. 8 is a well known form of ballistic galvanometer, and, therefore, its structure and operation will be briefly described. This galvanometer is associated with a stationary coil 38 having a hole 39, and consists of a stationary permanent magnet 40 having pole pieces of the shape and polarities shown, and an armature winding 41 on a drum 42 that is rotatably mounted between the pole pieces of the magnet. This drum is suspended from a wire 43 which is secured at its upper end to a stationary adjustable screw 44. One end of a spring 45 is secured to the bottom of the drum, and the other end of the spring is secured to a stationary adjustable screw 46. Wire 43 and spring 45 are also electrically connected to opposite ends of armature winding 41, thus connecting the latter in series with coil 38. A shunting resistance 47 is connected across coil 38. A stationary incandescent lamp 48 has a thin, straight filament 49, the lamp being connected to a suitable energizing source (not shown). Light from this lamp falls on a suitable stationary lens 50 which focuses a narrow vertical ray of light onto a mirror 51 carried by wire 43, the mirror reflecting this ray of light onto a stationary ground glass graduated scale 52 of the zero center type. By suitably adjusting screws 44 and 46 the ray of light reflected from mirror 51 can be made to fall on the zero mark of scale 52 when drum 42 is in its normally stationary position.

Any form of magnetic pick-up element may be used with the ballistic galvanometer. For example, assume that it is desired to use element 10 for determining the maximum value of an oscillatory or unidirectional current surge that flowed through conductor 14 in Fig. 1. Element 10 with shield 15 thereon will be placed adjacent conductor 14 as shown in Fig. 1. After the surge is over, element 10 without the magnetic shield will be inserted in hole 39 of coil 38 as shown in Fig. 8. The diameter of this hole is such as to allow the body of the pick-up element to pass readily therethrough, but not to permit pin 13 of the element to pass through. Element 10 should be so positioned in hole 39 that the length of its strips 11 protruding above and below the coil are substantially equal. This can be accomplished by suitably positioning an adjustable slide 53 on which element 10 rests. By pulling slide 53 in the direction shown by the arrow thereunder, the element 10 drops down through hole 39, thus causing a continually decreasing intensity of magnetic flux from the element to thread coil 38 until the element clears the hole. This induces a voltage in coil 38 which causes a current to flow through armature winding 41, thus causing drum 42 to rotate and the ray of light on scale 52 to move to one side or the other from its zero-indicating position. The extent of the movement of the ray of light on scale 52 from its zero-indicating position depends on the magnitude of the magnetic flux retained by element 10 after the surge, and, therefore, depends on the maximum value of the surge current that flowed through conductor 14. By suitably calibrating scale 52 in the manner described in connection with instrument 16, the ballistic galvanometer will indicate the maximum value of the surge current that flowed through conductor 14, irrespective of whether it was an oscillatory or unidirectional surge. Since element 10 will take practically the same time to drop down through hole 39 of coil 38 every time it is tested, the galvanometer will always accurately indicate the maximum value of the surge current. Furthermore, if the surge that passed through conductor 14 in Fig. 1 were a unidirectional surge, then the ray of light on scale 52 would move to one side of its zero-indicating position when this surge passed through the conductor in one direction, and would move to the other side of its zero-indicating position when this surge passed through the conductor in the opposite direction. The reasons for this are first, the relative positions of the magnetic poles of element 10 after the surge is over will depend on the direction in which the surge passes through the conductor; and, second, element 10 invariably will be placed in the same position in coil 38 of the galvanometer, i. e., with its pin below the coil, because the pin cannot pass through the hole of the coil. The galvanometer will therefore indicate the direction in which a unidirectional surge flowed through conductor 14. From this description it will be obvious that the galvanometer will also indicate the direction in which the current flowed through conductor 14 during that alternation of an oscillatory surge which had the maximum surge current.

I will now describe how to determine whether an oscillatory or a unidirectional surge current flowed through conductor 14, for example. Two magnetic elements 10 (or elements 35) will be positioned adjacent the conductor with only one of them surrounded by a magnetic shield 15, as shown in Fig. 1. First assume that an oscillatory surge current passes through conductor 14. From the previous descriptions it will be obvious that at the end of the surge the element 10 which is surrounded by shield 15 will retain a magnetic flux whose magnitude is a function of the maximum value of the surge current, whereas the element 10 which is not surrounded by a shield 15 will retain little or no magnetic flux. Therefore, when that element 10 which was surrounded by a shield 15 is inserted into hole 29 of instrument 16, after the oscillatory surge is over, the instrument will indicate the maximum value of the surge current; whereas, when that element 10 which was not surrounded by a shield 15 is inserted into hole 29 of the instrument, the latter will indicate zero or nearly zero. Now assume that a unidirectional surge current passes through conductor 14. From the previous description it will be clear that at the end of the surge both elements 10 will retain a magnetic flux whose magnitude is a function of the maximum value of the surge current, and, if the two elements are similar in all respects and are positioned at the same distance from conductor 14, that element which is surrounded by shield 15 will retain less flux than the element not surrounded by shield 15. However, as the magnetic flux retained by each element 10 can be controlled by changing its distance from conductor 14 and changing the number and length of its strips 11, it is readily possible to vary one or more of these factors so that the two elements will retain substantially the same value of flux at the end of the surge. Thus, for example, in Fig. 1 I have shown the two elements 10 positioned at the same distance from conductor 14, but it is to be understood that the number and lengths of their strips 11 are so selected that at the end of the surge both elements retain substantially the same value of magnetic flux. Therefore, each of these elements 10 will produce substantially the same indication of instrument 16 when it is inserted into hole 29 of the instrument after the surge is over. It should now be clear that when the two elements 10 cause considerably different indications of instrument 16 it proves that the surge current which magnetized the elements was an oscillatory surge, whereas when the two elements 10 cause substantially the same indication of the instrument it proves that the surge current which magnetized the elements was a unidirectional surge.

In accordance with the provisions of the patent statutes, I have described the principles of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:

1. Apparatus for measuring the maximum value of an electric current surge that flowed through a conducting body, said apparatus comprising a magnetic body possessing a high degree of magnetic retentivity and adapted to be so positioned adjacent the conducting body that the magnetic flux surrounding the latter during the current surge magnetizes it, means for substantially screening said magnetic body from the magnetic flux during that portion of the current surge period when the magnitude of the magnetic flux surrounding the conducting body is below a predetermined value, and an instrument calibrated with said magnetic body and responsive to the magnitude of the magnetic flux retained by it after such current surge is over.

2. Apparatus for measuring the maximum value of an electric current surge that flowed through a conducting body, said apparatus comprising a magnetic body possessing a high degree of magnetic retentivity and adapted to be so positioned adjacent the conducting body that the magnetic flux surrounding the latter during the current surge magnetizes it; a magnetic element so proportioned and adapted to be so positioned adjacent said magnetic body as substantially to screen the latter from magnetic flux during that portion of the current surge period when the magnitude of the magnetic flux surrounding the conducting body is below a predetermined value, and an instrument calibrated with said magnetic body and responsive to the magnitude of the magnetic flux retained by it after such current surge is over.

3. Apparatus for measuring the maximum value of an electric current surge that flowed through a conducting body, said apparatus comprising a magnetic body possessing a high degree of magnetic retentivity and adapted to be so positioned adjacent the conducting body that the magnetic flux surrounding the latter during the current surge magnetizes it, a magnetic element whose magnetic reluctance increases more rapidly than that of said magnetic body with increasing flux densities and whose magnetic reluctance becomes greater than that of said magnetic body when the magnitude of the flux that surrounds the conducting body is below the maximum value that surrounds the conducting body during the current surge, said magnetic element being adapted to be so positioned adjacent said magnetic body that it substantially functions as a magnetic screen for the magnetic body during a portion of the surge current period, and an instrument calibrated with said magnetic body and responsive to the magnitude of the magnetic flux retained by it after such current surge is over.

4. Apparatus for measuring the maximum value of an electric current surge that flowed through a conducting body, said apparatus comprising a magnetic body possessing a high degree of magnetic retentivity and adapted to be so positioned adjacent the conducting body that the magnetic flux surrounding the latter during the current surge magnetizes it, a magnetic element which has a lower magnetic reluctance than that of said magnetic body at low flux densities, but whose magnetic reluctance increases more rapidly than that of said magnetic body with increasing flux densities, said magnetic element being adapted to be so positioned adjacent said magnetic body that it substantially functions as a magnetic screen for the magnetic body during a portion of the current surge period, and an instrument calibrated with said magnetic body and responsive to the magnitude of the magnetic flux retained by it after such current surge is over.

5. Apparatus for measuring the maximum value of an electric current surge that flowed through a conducting body, said apparatus comprising a magnetic pick-up device adapted to be so positioned adjacent the conducting body that the magnetic flux surrounding the latter during the current surge effects the magnetization of this device, said pick-up device comprising a magnetic body and a magnetic element removably arranged so that one will surround the other, said magnetic element having a lower magnetic reluctance than said magnetic body at low flux densities and being so proportioned that it becomes substantially saturated when the magnitude of the magnetic flux surrounding the conducting body is below the maximum value of the flux which surrounds the conducting body during the current surge, and said magnetic body possessing a high degree of magnetic retentivity and having a higher saturation value than said magnetic element, and an instrument calibrated with said magnetic body and responsive to the magnitude of the magnetic flux retained by it after such a current surge is over.

6. An instrument for measuring the maximum value of an electric current surge that flowed through a conducting body, said instrument comprising a stationary magnetic body possessing a high degree of magnetic retentivity and adapted to be so positioned adjacent the conducting body that the magnetic flux surrounding the latter during the current surge magnetizes it, a removable magnetic element so proportioned and adapted to be so positioned adjacent said magnetic body as substantially to screen the latter from magnetic flux during that portion of the current surge period when the magnitude of the magnetic flux surrounding the conducting body is below a predetermined value, a movable magnetic member in a normally stationary position and adapted to be so placed adjacent said magnetic body that the magnetic flux retained by the latter after the current surge is over and the magnetic screening element has been removed effects a movement of the movable magnetic member from its normally stationary position to a different stationary position, and means operatively associated with said movable magnetic member for indicating in terms of surge current the amount it moves from its normally stationary position.

7. An instrument for measuring the maximum value of an electric current surge that flowed through a conducting body, said instrument comprising a stationary magnetic pick-up device adapted to be so positioned adjacent the conducting body that the magnetic flux surrounding the latter during the current surge effects the magnetization of this device, said pick-up device comprising a magnetic body and a magnetic element removably arranged so that one will surround the other, said magnetic element having a lower magnetic reluctance than said magnetic body at low flux densities and being so proportioned that it becomes substantially saturated when the magnitude of the magnetic flux surrounding the conducting body is below the maximum value of the flux which surrounds the conducting body during the current surge, and said magnetic body possessing a high degree of magnetic retentivity and having a higher saturation value than said magnetic element, a movable magnetic member in a normally stationary position and adapted to be so placed adjacent said magnetic body that the magnetic flux retained by the latter after such surge is over and the magnetic element of the pick-up device has been removed effects a movement of the movable magnetic member from its normally stationary position to a different stationary position, and means operatively associated with said movable magnetic member for indicating in terms of surge current the amount it moves from its normally stationary position.

8. A magnetic pick-up device comprising a magnetic body possessing a high degree of magnetic retentivity, and a magnetic element which has a lower magnetic reluctance than said magnetic body at low flux densities, but whose magnetic reluctance increases more rapidly than that of the magnetic body with increasing flux densities, said magnetic element being adapted to be so positioned adjacent said magnetic body that it substantially functions as a magnetic screen for the magnetic body up to a predetermined flux density.

9. A magnetic pick-up device comprising a magnetic body possessing a high degree of magnetic retentivity, and a magnetic element whose magnetic reluctance increases more rapidly than that of said magnetic body with increasing flux densities, and whose magnetic reluctance becomes greater than that of said magnetic body at a predetermined flux density, said magnetic element being adapted to be so positioned adjacent said magnetic body that it substantially functions as a magnetic screen for the magnetic body at flux densities up to said predetermined flux density.

10. A magnetic pick-up device adapted to be so positioned adjacent a conductor through which a surge current may flow as to pick up and retain after the surge is over a magnetic flux whose magnitude is a function of the maximum value of the surge current, said device comprising a magnetic body possessing a high degree of magnetic retentivity, and a magnetic element so proportioned and adapted to be so positioned adjacent said magnetic body as substantially to screen the latter from magnetic flux during that portion of the current surge period when the magnitude of the magnetic flux surrounding the conductor is below a predetermined value.

11. A magnetic pick-up device adapted to be so positioned adjacent a conductor through which a surge current may flow as to pick up and retain after the surge is over a magnetic flux which is a function of the maximum value of the surge current, said device comprising a magnetic body and a magnetic element removably arranged so that one will surround the other, said magnetic element having a lower magnetic reluctance than said magnetic body at low flux densities and being so proportioned that it becomes substantially magnetically saturated when the magnitude of the magnetic flux surrounding the conductor is below the maximum value of the flux which surrounds the conductor during the current surge, and said magnetic body possessing a high degree of magnetic retentivity and having a higher saturation value than said magnetic element.

12. A magnetic pick-up device adapted to be so positioned adjacent a conductor through which a surge current may flow as to pick up and retain after the surge is over a magnetic flux which is a function of the maximum value of the surge current, said device comprising a magnetic body possessing a high degree of magnetic retentivity, and means for substantially screening said magnetic body from the magnetic flux during that portion of the current surge period when the magnitude of the magnetic flux surrounding the conducting body is below a predetermined value.

13. The method of determining the maximum value of an electric current surge that flowed through a conducting body, which comprises the steps of subjecting a magnetic body possessing a high degree of magnetic retentivity to the magnetic flux surrounding the conducting body only during that portion of the current surge period when the magnitude of this flux exceeds a predetermined value, and measuring the strength of the magnetic flux retained by the magnetic body after the current surge is over.

14. The method of determining the maximum value of an electric current surge that flowed through a conducting body, which comprises the steps of employing the magnetic flux surrounding the conducting body during the current surge for magnetizing a magnetic body possessing a high degree of magnetic retentivity, substantially screening the magnetic body from magnetic flux only when the magnitude of this flux is below a predetermined value, and measuring the strength of the magnetic flux retained by the magnetic body after the current surge is over.

15. The method of determining the maximum value of an oscillatory electric current surge that flowed through a conducting body with varying amplitudes, which comprises the steps of employing the magnetic flux surrounding the conducting body during the current surge for magnetizing a magnetic body possessing a high degree of magnetic retentivity, substantially screening the magnetic body from magnetic flux during that portion of the current surge period when the flux magnitude is at least equal to the maximum value of the magnetic flux which surrounds the conducting body during that alternation of the surge which has the second highest maximum amplitude but is below the maximum magnitude of the magnetic flux which surrounds the conducting body during that alternation of the surge which has the highest maximum amplitude, and measuring the strength of the magnetic flux retained by the magnetic body after the current surge is over.

16. The method of determining whether an oscillatory or a unidirectional surge current flowed through a conducting body, which comprises the steps of subjecting one magnetic body possessing a high degree of magnetic retentivity to the magnetic flux surrounding the conducting body during the entire current surge period, simultaneously subjecting another magnetic body possessing a high degree of magnetic retentivity to the magnetic flux surrounding the conducting body only during that portion of the current surge period when the magnitude of this flux exceeds a predetermined value, and measuring the strength of the magnetic flux retained by each magnetic body after the current surge is over.

17. Apparatus for determining whether an oscillatory or a unidirectional surge current flowed through a conducting body, said apparatus comprising two magnetic bodies each possessing a high degree of magnetic retentivity and each adapted to be so positioned adjacent the conducting body that the magnetic flux surrounding the latter during the current surge passes through it in such a direction as to tend to magnetize it, means for substantially screening one of said magnetic bodies from the magnetic flux during that portion of the current surge period when the magnitude of the magnetic flux surrounding the magnetic body is below a predetermined value, and an instrument responsive to the magnitude of the magnetic flux retained by each of said magnetic bodies after such current surge is over.

CLIFFORD M. FOUST.